(No Model.)
W. H. SILVER.
EGG POACHER.
No. 329,859. Patented Nov. 3, 1885.
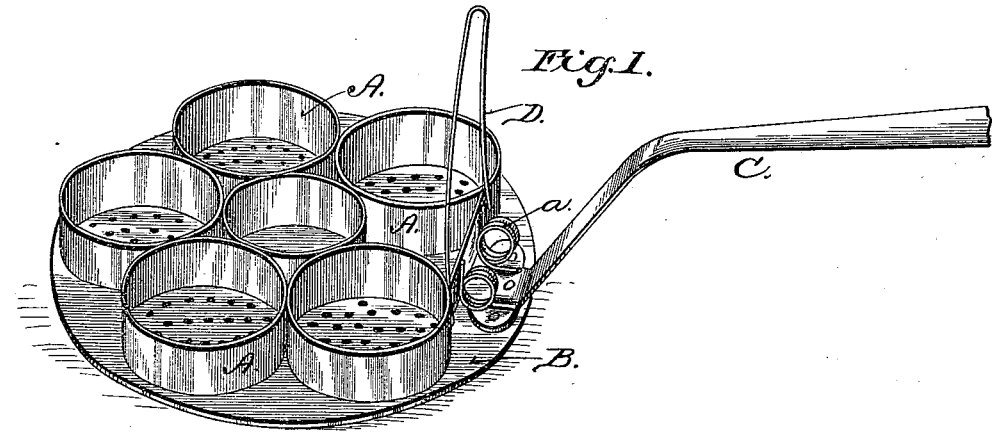
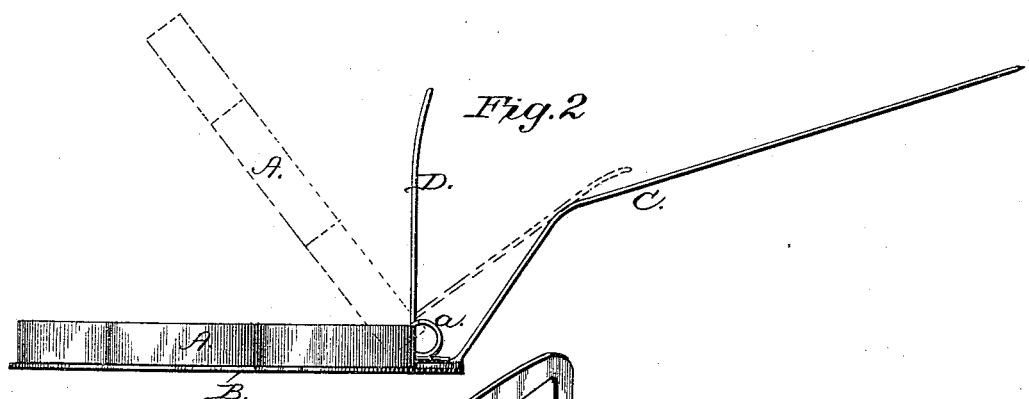
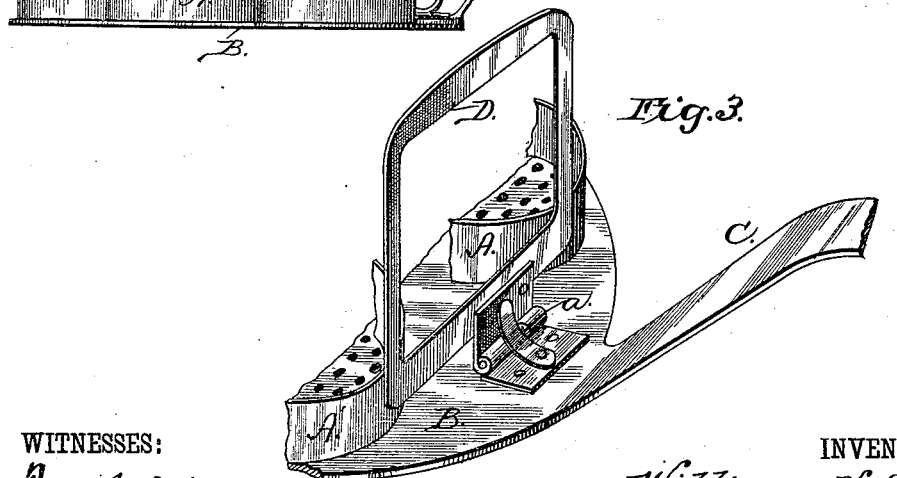
WITNESSES:
Fred. G. Dieterich
Jos. A. Ryan
INVENTOR.
William H. Silver.
By Parker H. Sweet Jr.
ATTORNEY

United States Patent Office.

WILLIAM H. SILVER, OF NEW YORK, ASSIGNOR OF ONE-HALF TO JNO. H. ERNST, OF BROOKLYN, NEW YORK.

EGG-POACHER.

SPECIFICATION forming part of Letters Patent No. 329,859, dated November 3, 1885.

Application filed May 28, 1885. Serial No. 166,940. (No model.)

*To all whom it may concern:*

Be it known that I, WILLIAM H. SILVER, a citizen of the United States, residing at New York city, in the county of New York and State of New York, have invented certain new and useful Improvements in Egg-Poachers; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification, and in which—

Figure 1 represents a perspective view of my complete invention; Fig. 2, a side elevation thereof, and Fig. 3, a modification.

Similar letters of reference indicate like parts in all the figures.

The object of my invention is to provide a simple and effectual utensil for poaching or frying eggs, whereby the eggs will present a nice uniform appearance when properly cooked, can easily and quickly be removed from said utensil without danger of burning the hands or liability of the eggs becoming broken or running together.

To accomplish these results I employ a skeleton-like frame, A, which is to surround the eggs and give them a uniform size and shape, said frame being hinged or pivoted by means of a suitable spring, $a$, to the surface-plate B, which forms the bottom of the completed utensil, and which is provided with a suitable handle, C, as shown.

To permit of the skeleton frame A being easily and quickly separated from the plate B for the removal of the eggs therefrom, I provide a projection or auxiliary handle, D, to be extended from the frame A in such manner that when said projection or handle is pressed back the frame A will be raised from the plate B, leaving the cooked eggs nested thereon in a uniform and nice shape, and said frame can be held in such position until the eggs are removed from the plate. As soon as the handle or projection D is released, the frame A will at once spring back to its proper place upon the plate B and be held securely thereon by means of the spring $a$ without the aid of any other attachments, so that none of the egg can pass out between the frame and plate.

The uses to which I intend my invention are particularly for frying or for poaching or boiling eggs without the shell.

For the purpose of frying eggs I prefer making the surface-plate B, which forms the bottom of the receptacle for containing the eggs, of a solid piece of metal, and to have the spring $a$, which acts as a hinge or pivot for securing the frame A to the plate B, attached in place without the means of solder or other material which would be affected by heat. I also prefer making the entire utensil without the use of solder.

In using the device for frying eggs, I first oil or grease the frame and plate to prevent the eggs from adhering to the same. Then heat the plate, which has the rings or frame A pressed closely upon its surface by means of the spring $a$. When the utensil has become properly heated, I drop one or more eggs into the skeleton-like rings forming the frame B, and when they are properly cooked or fried I lift said utensil from the fire by means of the handle C with one hand, and with the thumb of the same hand press back the auxiliary handle or projection D to raise the frame A from around the eggs, leaving the same in a nice shape and inviting appearance on the plate B. In this way they may be carried across the room to a table, where, with the other hand, by means of a knife or suitable article, they can be transferred from said plate B to a suitable dish without danger of burning the fingers. By releasing the projection or handle D the spring $a$ will at once force the frame into its proper place upon the plate and securely hold the same in that position without the aid of any catch or other similar contrivance, ready for operation again.

For poaching or boiling eggs without the shell, my utensil is used in a skillet or other suitable vessel, boiling water being used sufficient to cover the eggs, which are broken into the skeleton-like frame A, and when sufficiently cooked the utensil is lifted out and the water allowed to drain off. The frame is then raised from around the eggs in the manner already above described, when the eggs can be transferred to toast or to a suitable dish in the most convenient and ready manner.

Having thus described my invention, what I claim as new and useful is—

The herein-described utensil for frying or poaching eggs, consisting of the surface-plate B, having a suitable handle, C, the frame A, provided with handle or projection D, and the spring-hinge $a$, uniting said surface-plate B and frame A, substantially as specified.

In testimony whereof I affix my signature in presence of two witnesses.

WILLIAM H. SILVER.

Witnesses:
PARKER H. SWEET, Jr.,
EMMA M. GILLETT.